(12) United States Patent
Lowe et al.

(10) Patent No.: US 9,990,417 B2
(45) Date of Patent: *Jun. 5, 2018

(54) BOOLEAN-QUERY COMPOSER

(71) Applicant: Quid, Inc., San Francisco, CA (US)

(72) Inventors: Mary Kate Lowe, San Francisco, CA (US); Ruggero Altair Tacchi, San Francisco, CA (US); Alex Marrs, San Francisco, CA (US); Oriana Jeannette Love, Alameda, CA (US)

(73) Assignee: Quid, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/375,641

(22) Filed: Dec. 12, 2016

(65) Prior Publication Data

US 2017/0293676 A1    Oct. 12, 2017

Related U.S. Application Data

(63) Continuation of application No. 15/092,938, filed on Apr. 7, 2016, now Pat. No. 9,552,412.

(51) Int. Cl.
*G06F 17/30* (2006.01)
(52) U.S. Cl.
CPC .. *G06F 17/30646* (2013.01); *G06F 17/30011* (2013.01); *G06F 17/30424* (2013.01); *G06F 17/30678* (2013.01); *G06F 17/30696* (2013.01)

(58) Field of Classification Search
None
See application file for complete search history.

(56) References Cited

U.S. PATENT DOCUMENTS

| | | | |
|---|---|---|---|
| 6,925,608 B1 * | 8/2005 | Neale | G06F 17/30637 707/E17.062 |
| 7,334,195 B2 * | 2/2008 | Gemmell | G06F 17/30991 707/999.003 |
| 8,631,029 B1 * | 1/2014 | Amacker | G06F 17/30554 707/766 |
| 2004/0034625 A1 * | 2/2004 | Reddy | G06F 17/30398 |
| 2005/0080769 A1 * | 4/2005 | Gemmell | G06F 17/30991 |
| 2006/0004708 A1 * | 1/2006 | Hartmann | G06F 17/30864 |
| 2007/0233692 A1 * | 10/2007 | Lisa | G06F 17/30651 |

(Continued)

*Primary Examiner* — Hung Le
(74) *Attorney, Agent, or Firm* — Pillsbury Winthrop Shaw Pittman LLP

(57) ABSTRACT

Provided is a process of refining Boolean queries, the process including: obtaining a query; searching a corpus of documents based on the query; selecting narrowing terms that pertain to respective subsets of the responsive documents; selecting broadening terms related to the query; instructing the user's computing device to present a graphical user interface comprising: graphical representations of the narrowing terms; graphical representations of the broadening terms; and one or more user inputs by which the user refines the query by adding a selected narrowing term or a selected broadening term; obtaining a user selection of a broadening term or a narrowing term; forming a refined query based on the user selection; searching at least part of the corpus based on the refined query to identify refined responsive documents; and instructing the user's computing device to present an updated graphical user interface with information about the refined responsive documents.

36 Claims, 11 Drawing Sheets

(56) References Cited

U.S. PATENT DOCUMENTS

| | | | | |
|---|---|---|---|---|
| 2007/0266017 | A1* | 11/2007 | Held | G06F 17/30967 |
| 2009/0006358 | A1* | 1/2009 | Morris | G06F 17/30672 |
| 2009/0228474 | A1* | 9/2009 | Chiu | G06F 17/30516 |
| 2010/0114925 | A1* | 5/2010 | Shafer | G06F 17/30864 707/759 |
| 2011/0055188 | A1* | 3/2011 | Gras | G06F 17/30528 707/706 |
| 2011/0154405 | A1* | 6/2011 | Isaias | H04N 5/44513 725/53 |
| 2012/0290614 | A1* | 11/2012 | Nandakumar | G06F 17/30864 707/770 |
| 2012/0323904 | A1* | 12/2012 | Qiao | G06F 17/30672 707/723 |
| 2013/0091113 | A1* | 4/2013 | Gras | G06F 17/30864 707/706 |
| 2013/0097153 | A1* | 4/2013 | Barbieri | G06F 17/30817 707/722 |
| 2013/0265319 | A1* | 10/2013 | Fisher | G06T 13/00 345/589 |
| 2013/0304722 | A1* | 11/2013 | Chen | G06F 17/30241 707/715 |
| 2013/0325831 | A1* | 12/2013 | Bao | G06F 17/30398 707/706 |
| 2014/0236933 | A1* | 8/2014 | Schoenbach | G06F 17/3005 707/723 |
| 2015/0095319 | A1* | 4/2015 | Ormont | G06F 17/30424 707/723 |
| 2015/0278901 | A1* | 10/2015 | Windemuth | G06F 19/324 705/26.5 |
| 2015/0310005 | A1* | 10/2015 | Ryger | G06F 17/30011 707/706 |
| 2015/0310114 | A1* | 10/2015 | Ryger | G06F 17/30011 707/728 |
| 2015/0317320 | A1* | 11/2015 | Miller | G06F 17/3053 707/728 |
| 2016/0132552 | A1* | 5/2016 | Xue | G06F 17/30392 707/766 |
| 2017/0075536 | A1* | 3/2017 | Cho | G06F 17/30867 |

* cited by examiner

BOOLEAN-QUERY COMPOSER

CROSS-REFERENCE TO RELATED APPLICATIONS

The present patent is a continuation of U.S. patent application Ser. No. 15/092,938, filed 7 Apr. 2016, having the same title, the entire content of which is hereby incorporated by reference.

BACKGROUND

1. Field

The present invention relates generally to computational linguistics and, more specifically, to techniques for composing and refining Boolean queries on data sets related to computational linguistics.

2. Description of the Related Art

Often people wish to draw inferences based on information contained in, and distributed among, relatively large collections of documents, e.g., substantially more documents than they have time to read or the cognitive capacity to analyze. Certain types of inferences implicate relationships between those documents. For example, it may be useful to organize documents by the subject matter described in the documents, sentiments expressed in the documents, or topics addressed in the documents. In many cases, useful insights can be derived from such organization, for example, discovering taxonomies, ontologies, relationships, or trends that emerge from the analysis. Examples might include organizing restaurants based on restaurant reviews, organizing companies based on content in company websites, organizing current events or public figures based on new stories, and organizing movies based on dialogue.

One family of techniques for making such inferences is computational linguistic analysis of text, such as unstructured text, within the documents of a corpus, e.g., with natural language processing techniques, like those based on distributional semantics. Computers are often used to perform semantic similarity analyses within corpora to gauge document pair-wise similarity of the documents according to various metrics, or pair-wise measures of relationships between entities, topics, terms, or sentiments discussed in the documents, which may be crafted to yield results like those described above. Through the sophisticated use of computers, inferences that would otherwise be impractical are potentially attainable, even on relatively large collections of documents.

In many cases, the collections of documents are relatively large, for example, more than 100 documents, and in many cases more than 10,000 documents, making it difficult for users to effectively explore the results of analyses. One powerful tool for interrogating such a corpus, or an analysis of such a corpus, is a Boolean query.

Boolean queries are used in a variety of contexts, including to express queries for relational databases and queries for searching natural language in unstructured documents. This query format has the advantage of being relatively expressive and precise. Very complex queries can be expressed as combinations of query elements (like keywords or database field values or ranges) and Boolean operators (like "and," "or," and "not"). For these reasons, Boolean queries are often favored by developers of software systems.

Many users, however, struggle to properly formulate Boolean queries. Non-technical users are often not trained in formal logic and find Boolean queries to be nonintuitive and frustrating. Compounding this problem, typical use cases for Boolean queries involve iterative query formulation, by which a user submits a query, reviews the results, and then refines their query, in an iterative process until they reach the search results that they desire. Thus, to use this powerful technique, the user formulates multiple queries, adjusting the queries at the margin, a process that can be particularly nonintuitive for less sophisticated users.

SUMMARY

The following is a non-exhaustive listing of some aspects of the present techniques. These and other aspects are described in the following disclosure.

Some aspects include a process of refining Boolean queries, the process including: obtaining a query provided by a user via a user's computing device; searching a corpus of documents based on the query to identify responsive documents, the corpus having more than 2,000 documents; selecting narrowing terms that pertain to respective subsets of the responsive documents; selecting broadening terms related to the query; instructing the user's computing device to present a graphical user interface comprising: graphical representations of the narrowing terms; graphical representations of the broadening terms; and one or more user inputs by which the user refines the query by adding a selected narrowing term or a selected broadening term; obtaining a user selection of a broadening term or a narrowing term; forming a refined query based on the user selection; searching at least part of the corpus based on the refined query to identify refined responsive documents; and instructing the user's computing device to present an updated graphical user interface with information about the refined responsive documents.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
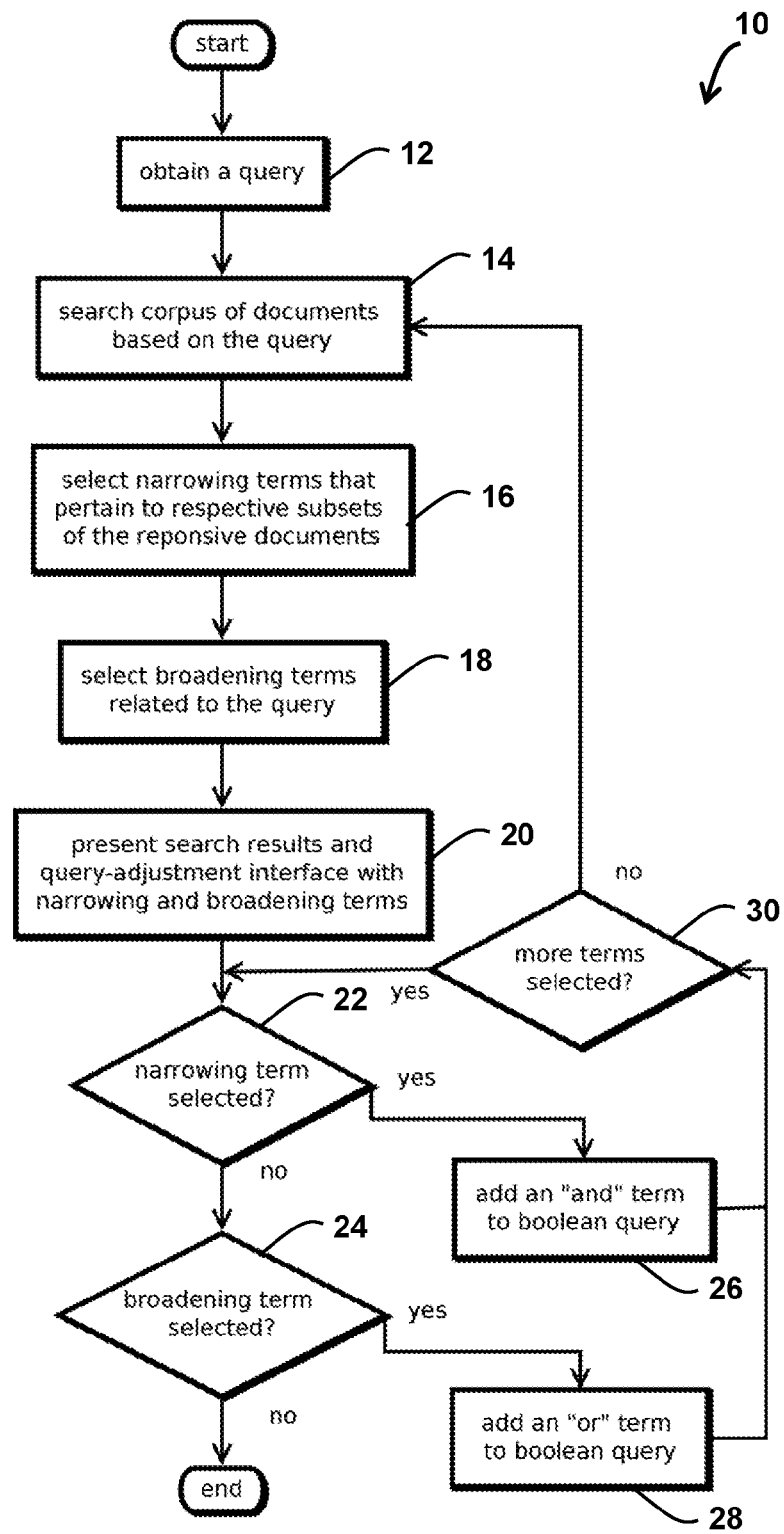
FIG. 1 is a flow chart of an example of a process for refining a Boolean query.
Figure 2:
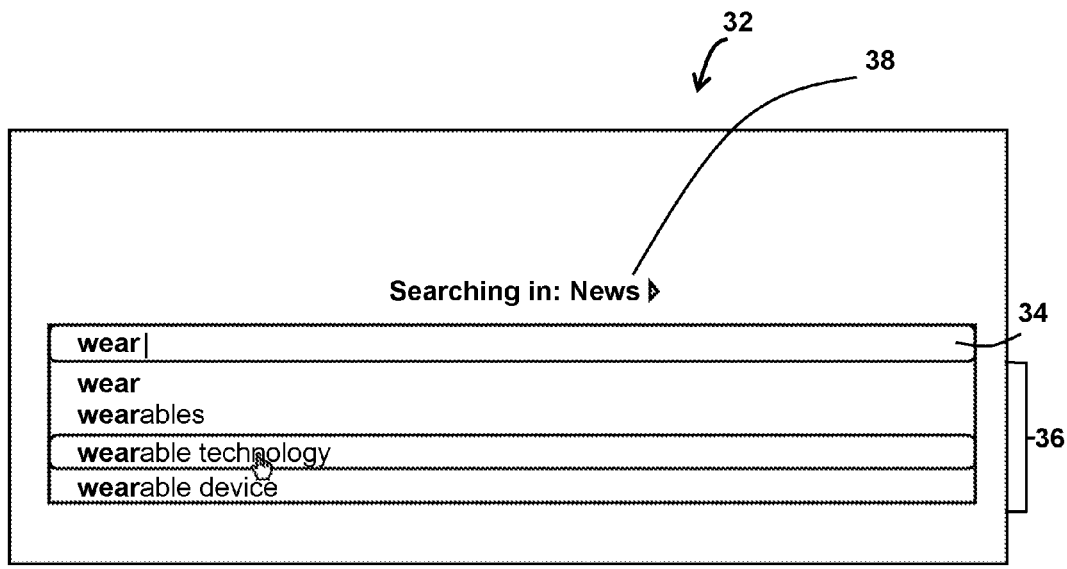
FIG. 2 is a user interface corresponding to a query result step of FIG. 1.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others at the intersection of the fields of computational linguistics and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some of the above-mentioned problems with traditional techniques for forming Boolean queries may be mitigated by the techniques described herein. Some embodiments may allow users to iterate relatively seamlessly on their Boolean queries by providing an intuitive, dynamically adjusted visual guide to the user. Some embodiments may provide candidate query terms for a user to consider adding to their query, and some embodiments may graphically distinguish between terms suitable for broadening the query (e.g., with an "or" Boolean operator) and terms suitable for narrowing the query (e.g., with an "and" or "and not" Boolean operator). Further, some embodiments may embed these tools in a larger graphical user interface with filters that are combinable with the queries and snippets of text and statistics that allow the user to quickly visually parse whether a query requires refinement to reach their desired results. In some embodiments, portions of these graphical user interfaces are constructed dynamically with client-side scripts to reduce round-trip exchanges with remote servers and provide a relatively low-latency responsive graphical user interface. That said, not all embodiments provide all of these benefits, as several inventions are described, and the different inventions are independently useful.

Some of the present techniques may relieve users of a cognitive burden, by composing queries. But this does not mean that the present techniques are performing a mental process. Rather specific computational steps are described that produce a result that some more sophisticated users are able to produce with their mind, but the invention is in the means, not the ends. The computational steps by which this is implemented are not mental processes. Even sophisticated users do not compose queries with mental steps that match those described herein, e.g., broadening and narrowing terms are selected and presented based on larger collections of data than any human being could process in their mind, and the graphical user interfaces that are generated have no analog in the mental process of users. Accordingly, the present techniques should not be confused with abstract ideas relating to mental processes.

FIG. 1 is a flow chart depicting an example of a process 10 for refining a Boolean query in accordance with some of the present techniques. In some embodiments, the process 10 may be stored on a tangible, non-transitory, machine-readable media such that when the instructions are executed by a data processing apparatus, like that described below with reference to FIG. 11, the operations of process 10 are effectuated. In some embodiments, the process 10 may be performed by a component of a computational linguistics system described below with reference to FIG. 10, e.g., executing on the computer system described with reference to FIG. 11. Examples of the process 10 may yield graphical user interfaces presented on a user device like those described below with reference to FIGS. 2 through 9. In some embodiments, an instance of the process 10 may be executed server-side for each session with an individual remote user interfacing with the server via a client computing device, for example, over the Internet. Thus, in some cases, a relatively large number of instances of the process 10 may be ongoing concurrently, for instance, more than 100 or more than 1000 instances operating concurrently, each instance serving a different user session.

In some embodiments, the process 10 may begin with obtaining a query. In some embodiments, the query may be entered by a user entering text into a text input box of a webpage in their web browser. An example of such a graphical user interface is illustrated in the graphical user interface 32 of FIG. 2, which may be displayed upon rendering code sent to a user device. In this example, the graphical user interface includes a text input box 34 into which the user types query elements, like keywords. In some embodiments, the text input box may be hidden (e.g., completely, for instance by not sending code that causes the input to be displayed), and the graphical components displayed may initially represent the entire document corpus, e.g., with the types of results shown in FIGS. 3 and 4. In this example, a Boolean query may still be generated on the backend server, but not exposed to users.

In this example, the user interface 32 further includes query completion suggestions 36. In some embodiments, the query completion suggestions 36 may be obtained by sending partially completed queries to a remote server system (e.g., by a client-side event handler executing in JavaScript™ receiving a character entered event), which may then select candidate responsive query suggestions and ranked those suggestions. The responsive suggestions may be sent back to the client device, for example, before the user types a subsequent character or before the user finishes entering their query, and candidate suggestions consistent with the currently entered query (which may have acquired additional characters) are presented in ranked order. In some cases, the candidate suggestions are refined as additional characters are entered to eliminate candidates that have a different prefix from the currently entered characters. In some embodiments, a user may select, e.g. click on, touch, or arrow down to, one of the suggestions and complete the query.

In this example, the query input interface 32 includes a corpus identifier 38. In some embodiments, the corpus identifier can be selected by the user, and the remote server system (e.g., like that described with reference to FIG. 10) may send identifiers of a plurality of different corpora among which the user can select to search within the corresponding bodies of documents. Examples of different corpora are described below with reference to FIG. 10, which describes a computational linguistics system operative to ingest documents, preprocess the documents to facilitate search, and label the documents with various metadata to facilitate exploration of the corpora.

As illustrated in FIG. 1, the process 10 may further include searching a corpus of documents based on the query, as indicated by Block 14. In commercially relevant use cases, the corpus of documents is expected to be a relatively large collection of unstructured natural language text documents. A variety of examples are described below. In some embodiments, the corpus may include more than 1000, more than 2000, more than 5000, or more than 50,000 natural language text documents having a median length of greater than, for example, 500 words. Or embodiments are also consistent with shorter documents, like micro-blog posts of less than or equal to 140 characters. In some embodiments, the corpus of documents may be documents related in some sense, for example, from the same source or category of sources. In some cases, each document may be associated with metadata, like an author, title, the publication date, a version, and the like, and Boolean queries may be supplemented by filtering according to the metadata.

That said, some of the present techniques are not limited to corpa of unstructured text. Some of the Boolean query refinement techniques are expected to be useful for interrogating other data sets, or for interrogating structured data associated with unstructured text documents. For instance, various metadata elements of the corpora may serve as the related suggested broadening categories or the refining categories described herein. For example, a data set of college basketball statistics may have text bios of players and associated player attributes, like date of birth. One metadata attribute may be date of birth. Some embodiments may present broadening and refining categories based on date of birth.

In some embodiments, searching the corpus of documents may be expedited by preprocessing the documents. For example, in some embodiments, an index of the documents according to keyword (e.g., with an n-gram serving as the index keys, which are each paired with a set of document identifiers in which the n-gram is present) may be formed in advance of obtaining the query. In some embodiments, the index identifies the number of times each word appearing in the corpus appears in each document. For instance, an index key corresponding to the word "wearable" may have values corresponding to unique document identifiers of every document in which the term "wearable" occurs and the number of occurrences in that document for ranking purposes.

In some embodiments, a multi-term query may be serviced by identifying each index entry in which a term (e.g., an n-gram of two words, three words, or the like) in the query serves as a key and then combining the responsive documents according to Boolean operators between the keywords. For example, a Boolean operator in the conjunctive form, "and," between two keywords may cause the system to identify index values (i.e., document identifiers) associated in the index with the keywords on either side of the operator. Embodiments may then determine which document identifiers appear in both lists to identify results. Similarly, a Boolean operator in the disjunctive form, "or," may cause the system to append index values associated with each of the keywords on either side of the operator. In some embodiments, duplicate index values may be condensed into a single representative entry. In some embodiments, the responsive entries may be ranked, for example, based on the number of times that the keywords appear in the documents, or based on both the number of times the keywords appear in the documents and the context in which those keywords appear, for example, in association with other terms related to those keywords (e.g., having a greater than a threshold co-occurrence rate).

In some embodiments, many (and in some cases, most) queries are expected to return relatively large collections of documents. This is the intended use case of some embodiments, which is distinct from many online search engines designed to return the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

To this end, some embodiments may present search results in graphical user interfaces like those illustrated in FIGS. 3 and 4, or in the force directed graph representations described below in some cases, presenting graphical user interfaces may be performed by sending instructions to a client device that cause the client device to prepare and render a display (e.g., a graphical, haptic, or audible stimulus). In some embodiments, the instructions are conveyed in the hypertext transport layer protocol, for example, as a web pages encoded in hypertext markup language, cascading style sheets, JavaScript™, and various serialized data formats, like JavaScript object notation.

In some embodiments, some or a substantial portion of the logic of the graphical user interface may be executed on the client device to facilitate relatively responsive graphical user interfaces. For example, graphical user interfaces may be updated by inserting or removing components of a document object model in memory of a browser rather than re-composing an entire webpage on the server and sending the entire webpage with the updated view to the client device to be re-rendered. In some embodiments, both data being displayed and data potentially relevant to the current view (but not immediately displayed) may be sent as JSON objects, and the graphical user interface may be updated client-side without requesting additional data by referencing cached data and updating the document object model. Embodiments are also consistent with applying these techniques to virtual document object models and with special-purpose, non-web browser applications, like native applications executing on mobile devices. Or, some embodiments may favor simpler client-sized code, and compose updated views substantially entirely server-side.

Figure 3:
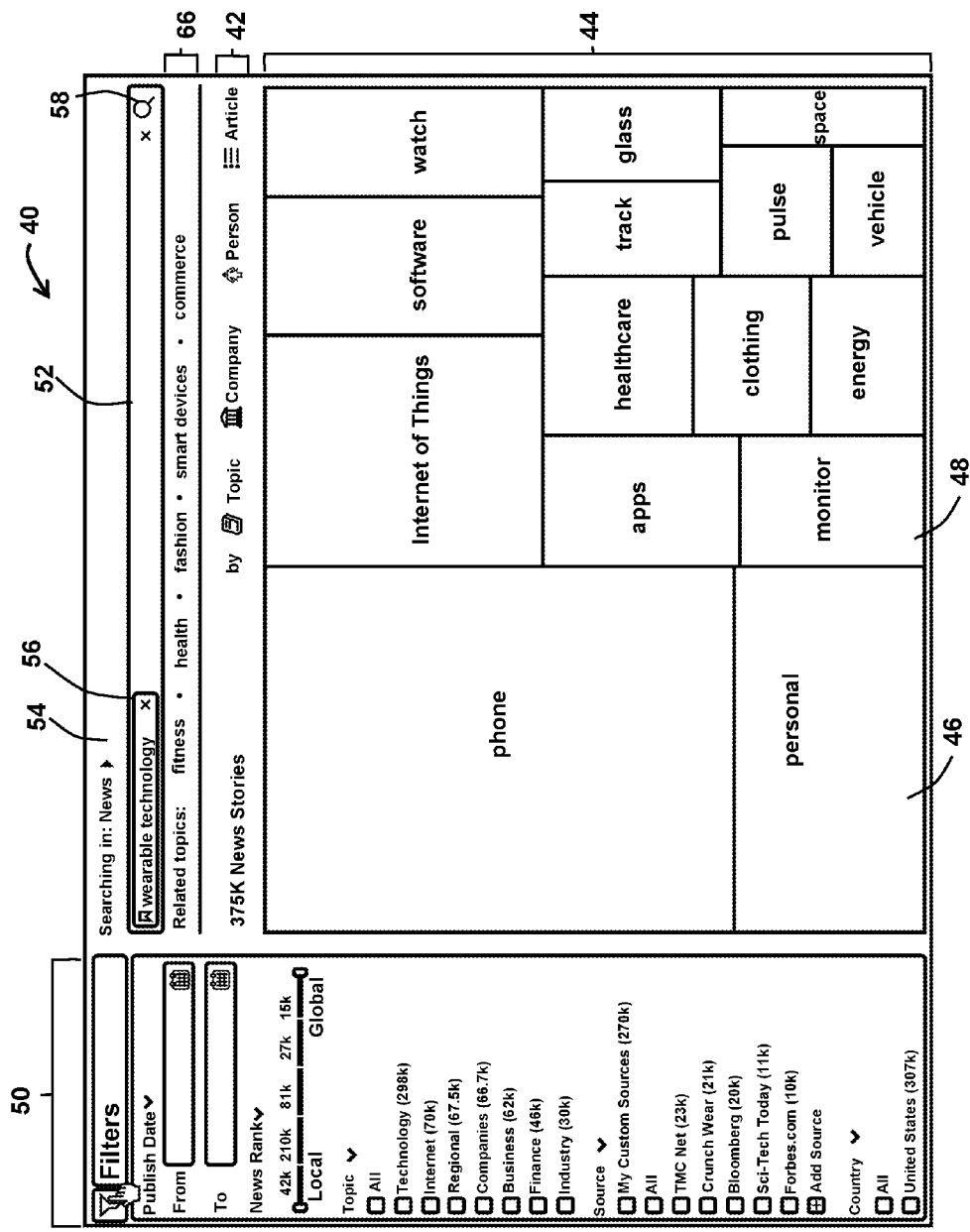
FIG. 3 is another portion of the user interface corresponding to a query result step of FIG. 1.

In the graphical user interface 40 of FIG. 3, information about responsive search results is displayed. In this example, 375,000 documents are identified as responsive to the query.

Some embodiments determine various statistics about these documents to characterize the search results for the user in a meaningful way that provides insight about the responsive collection of documents. In this example, the statistics are presented in a faceted view with several user selectable facets 42. Each facet, in this example, corresponds to a category of items about which statistics are calculated. Examples of such items are described below and may include document topic, author, company, entities mentioned, sentiment, and the like. In some embodiments, the statistics include the number of documents to which the respective item pertains, the strength of pertinence of the respective item to the documents, and weighted combinations thereof. Some embodiments may calculate an item score, and the graphical user interface may be prepared to provide a visual indication of the item score.

In this example item scores are graphically represented in a proportional shape graph 44. A variety of different types of space-filling layouts, like proportional shape graphs, may be used. Examples include Voroni diagrams, bubble charts, or a tree map like the tree map illustrated in FIG. 3. In this example, the graph 44 includes a region 46 corresponding to documents about personal wearable technology and another region 48 corresponding to monitoring wearable technology. In some embodiments, a dimension of these regions may be indicative of statistics about the documents pertaining to that attribute. In some embodiments, the dimensions area, and the area corresponds to the statistics. In some embodiments, the dimension is length or radius, and the length or radius corresponds to the statistic's value. The correspondence can be linear or, particularly when a relatively wide range of values is experiences, nonlinear, for example, logarithmic. In some embodiments, other visual attributes may represent the statistics, for example, attributes that afford visual weight, like color, saturation, transparency, drop shadows, fonts, and the like.

In some embodiments, the graph 44 may be composed with a tiling algorithm that selects the dimensions of the shapes based on the statistics of the documents. For example, a size and aspect ratio for the graph 44 may be obtained by querying the attributes of a window object in the browser and subtracting space for other components of the graphical user interface. These dimensions may be input, along with the statistics into a tiling algorithm, like a tree map algorithm, such as the binary tree algorithm, the mixed tree map algorithm, the ordered tree map algorithm, the slice and dice tree map algorithm, the squarified tree map algorithm, the strip tree map algorithm, and the like.

In some embodiments partitioning a plane according to a relatively large set of statistics can be a computationally complex task that scales poorly as the number of values increase. A variety of iterative techniques may be used to make the problem tractable. For example, some embodiments may iteratively and alternatively subdivide the available space with the values corresponding to statistics and select rectangle sizes based on whether the aspect ratio of the candidate rectangle satisfies a threshold.

In some embodiments, the graphical user interface 40 further includes a region 50 with user selectable filters. In some embodiments, user selectable filters may further limit the Boolean query, for example, based on metadata of the documents. Examples include publication date ranges, geographic proximity to a reference location, topic categories, document source categories, or a country associated with the document.

Of particular note, in some embodiments, the graphical user interface includes a query editing input 52. In some embodiments, the query editing input includes a graphical element 54 representing the currently submitted query. In some embodiments, the visual attributes of the graphical element 54 indicate this status. Examples of such graphical elements include color, font, transparency, saturation, vibratory movement, drop shadow, and the like. In some embodiments, the graphical element includes text corresponding to the text of the query element and an input 56 by which the query element may be removed from the query upon user selection. In some embodiments, the query editing input further includes a query submit input 58 that causes the corresponding query to be sent to a server and executed. In some embodiments, the various inputs may each be associated with an event handler executing in JavaScript that effectuates the corresponding actions in response to a specified event, like a user click, touch, hover, or the like.

Figure 4:
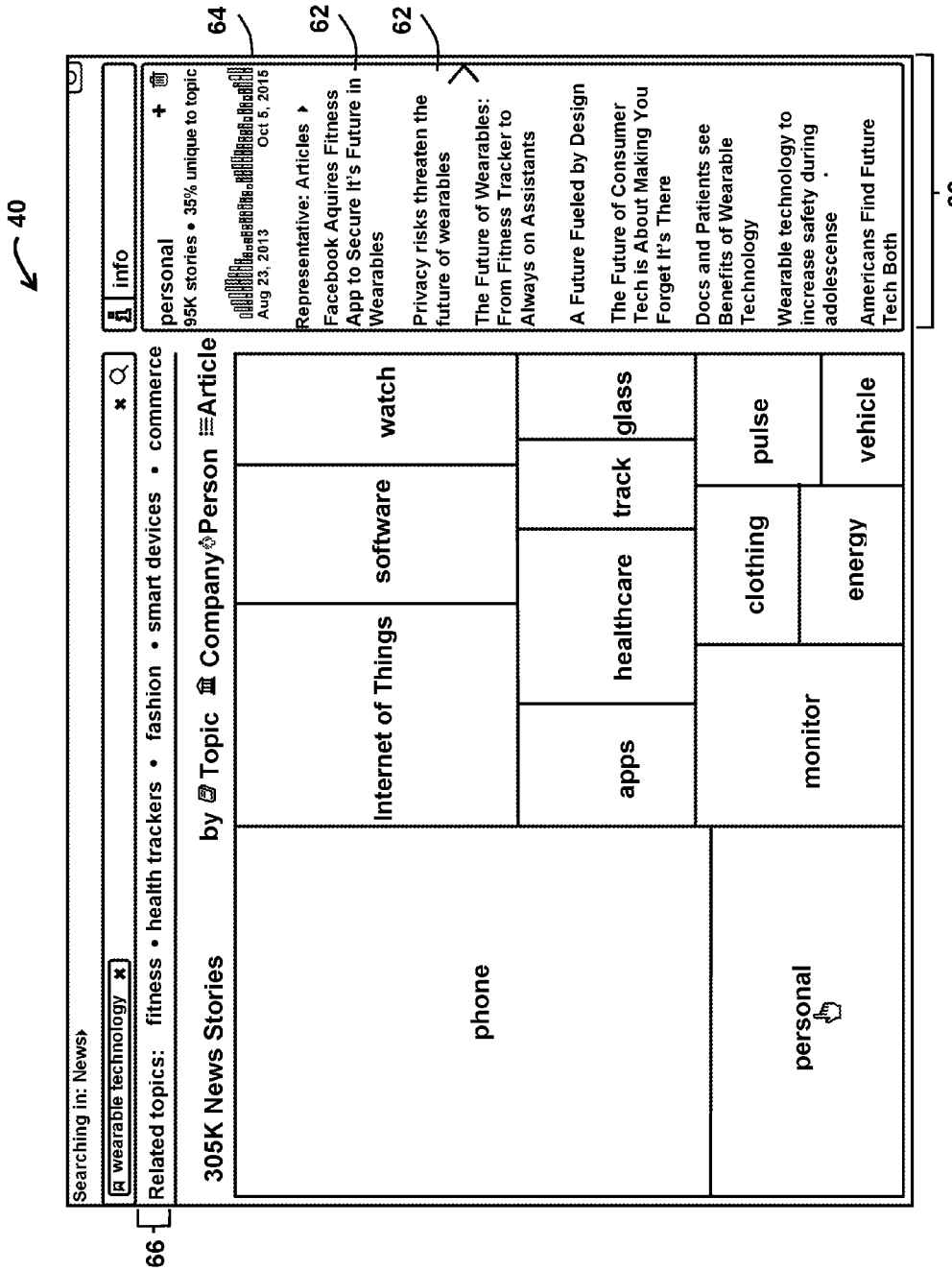
FIG. 4 is a user interface corresponding to a query result exploration consistent with the process of FIG. 1.

FIG. 4 is another view of the graphical user interface 40 showing a response of the graphical user interface 40 to a user selection of one of the items in region 44, in this case topic 46. Upon selecting a topic, in some embodiments, the server may send information, or data cached in the browser may be retrieved, to present a summary of the item in region 60. In this example, region 60 includes representative articles and snippets 62 of those articles. In this example, 95,000 articles correspond to the item. Representative articles may be selected, for instance, randomly, or based on the strength of a score by which the articles, or documents, were assigned to the item. Further information about the topic is presented in a time series 64 which may be a graph having bins corresponding to time ranges, like one week or one month, and heights corresponding to document counts of the documents in respective bins, for instance, published during those time bins, like in a time-series histogram. Some embodiments may further include statistics like a percentage of the documents that are unique to that item or that are unique to that topic (without pertaining to other topics) to assist with query refinement.

The query that yields of the results shown in FIGS. 3 and 4 may be modified with steps shown in the process 10 of FIG. 1. As shown in FIG. 1, in some embodiments, before search results are presented, some embodiments may select narrowing terms that pertain to respective subsets of the responsive documents, as indicated by Block 16. Examples of narrowing terms are the items shown in region 44 and selectable through faceted inputs 42 in FIGS. 3 and 4. In some embodiments, the narrowing terms are topics, entities mentioned, keywords, or metadata attributes of the documents in the corpa (or other data set), and the like. The terms are narrowing because they only pertain to a subset of the documents and when selected are used to identify a subset of the documents. A narrowing term may also pertain to documents outside of the search results, but the term does not become broadening merely in virtue of this fact. Rather, it is the combination of the term pertaining to a subset of the documents, and the term being used to identify that subset that makes the term a narrowing term.

Narrowing terms (which may be, e.g., n-grams, qualitative metadata attributes, and quantitative metadata attributes) may be identified with a variety of techniques. In some embodiments, narrowing terms are keywords appearing in the documents. Examples of potentially relevant keywords may be obtained with various techniques, for example, responsive to term frequency inverse document frequency exceeding a threshold, with named entity recognition algorithms, topic extraction algorithms, and the like, being executed on the responsive documents. In some embodiments, documents may be preprocessed with these algorithms and associated with results to expedite operations at query time.

Some embodiments may also select broadening terms related to the query, as indicated by Block 18 of FIG. 1. In some embodiments, broadening terms may be selected based on some semantic relationship to the search results. Examples include terms having a high co-occurrence with search terms (e.g., greater than a threshold amount or frequency). Other examples include terms having a high co-occurrence with terms co-occurring with the search terms above a threshold. Again, broadening terms may appear in the documents and serve both as a narrowing term and a broadening term and be presented in two locations on the user interface, once in an area for broadening terms and once in an area for narrowing terms. A term serves as a broadening term if it is presented as a candidate to expand the search results beyond the current responsive documents, rather than searching exclusively within the responsive documents. In some embodiments, different criteria may be used to select broadening terms that are used to select narrowing terms, as user intent often varies between these interactions.

Terms (e.g., words or n-grams) appearing in region 44 may serve as narrowing terms, and the list of related terms in region 66 may serve as the broadening terms. Thus, terms in different regions of the interface, with different visual attributes, appearing concurrently, may be selected by the user to add query elements and Boolean operators associated with those query elements, as described in greater detail below. The addition may be in the proper syntax for a Boolean query, in some cases adding parenthetical operators needed to effectuate user intent. This is expected to facilitate more adept editing of Boolean queries, even by less experienced users, and is expected to save keystrokes for more advanced users. The cognitive load of identifying query elements is expected to be reduced for the user by presenting likely candidate options. And the cognitive load of selecting an appropriate Boolean operator and syntax for those query elements is further reduced by automatically applying those Boolean operators upon selection of the candidates by a user and, in some embodiments, by automatically generating correct syntax, like appropriately applied parentheses and accounting for order of operations of Boolean operators.

As illustrated in FIG. 1, next, some embodiments may determine whether a narrowing term is selected, as indicated by Block 22 and, if not, whether a broadening term is selected, as indicated by Block 24. The selection may be by the user among the presented candidate narrowing terms and broadening terms in the graphical user interfaces described with reference to FIGS. 3 and 4. Selection may be accomplished with a variety of techniques, including clicking, touching, hovering, and navigating through a selection menu. As illustrated, upon a user selecting a narrowing term, some embodiments may add in "and" operator to the existing Boolean query as indicated by Block 26. In some embodiments, a negative conjunctive query element may be added instead of a positive conjunctive query element. The addition may include adding both a query element corresponding to the term and the Boolean operator in the appropriate syntax. Similarly, upon the broadening term being selected, some embodiments may add an "or" term to the Boolean query, as indicated by Block 28. Again, both positive and negative disjunctive query terms may be added, and the addition may be in the appropriate syntax for a Boolean expression. Some embodiments may maintain a record of cursor position in the Boolean query, and elements may be added based on the cursor position, which may be a relevant parameter for more complex queries, e.g., to adjust within a parenthetical set of operators.

Next, some embodiments may determine whether more terms are selected, as indicated by Block 30. If more terms are to be selected, embodiments repeat steps 22, 24, 26, or 28, in some cases iteratively until the user has fully compose the query or refine query. In some embodiments, the user may delete query elements as well during this process. Alternatively, upon determining that the user is done selecting query terms, embodiments may return to block 14 and research the corpus of documents to compose new search results and update the graphical user interfaces accordingly. In some embodiments, a user may iterate through the process 10 through multiple loops, refining their query until they reach their desired result.

Query composition and refinement in the context of graphical user interface 40 is shown in greater detail in FIGS. 5 through 9. These interfaces may be presented as a user iterates through steps 22, 24, 26, or 28 in FIG. 1.

Figure 5:
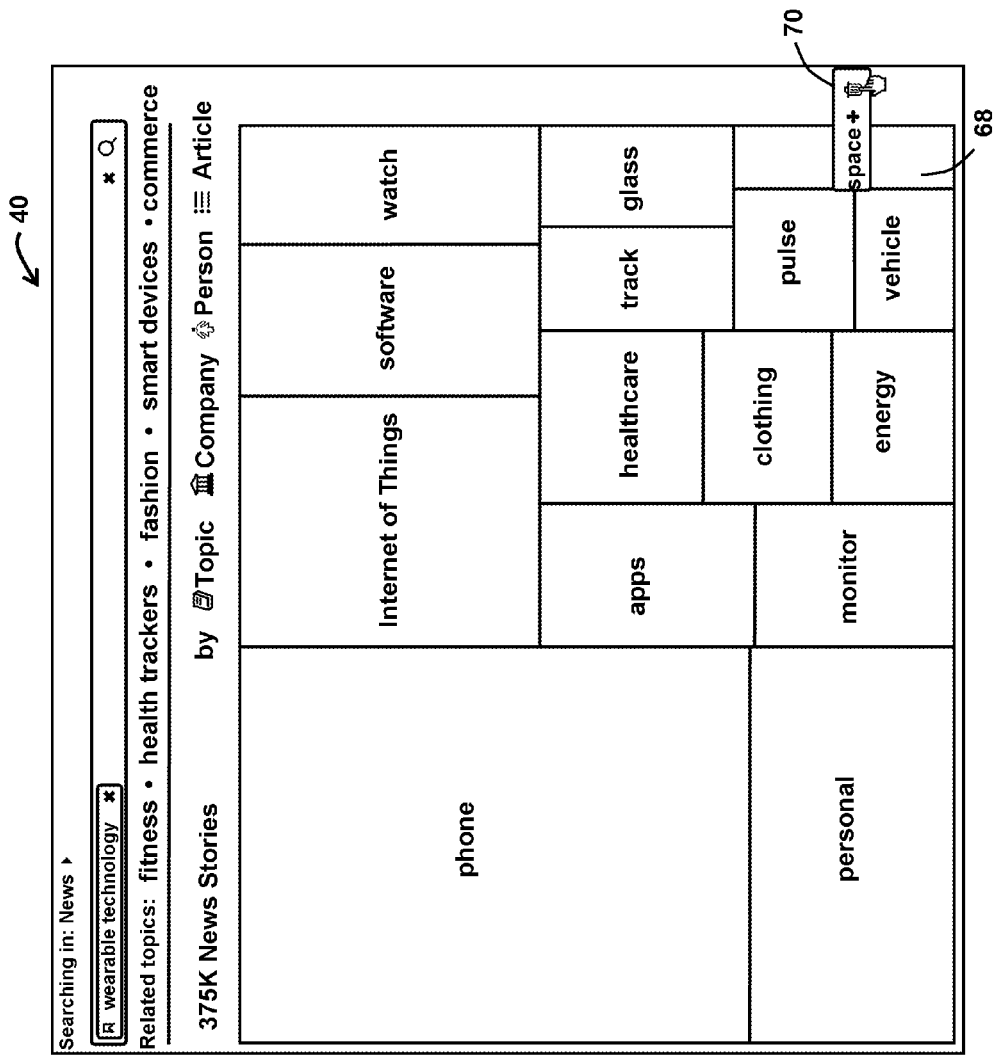
FIG. 5 is a user interface corresponding to a query modification step of FIG. 1.
Figure 6:
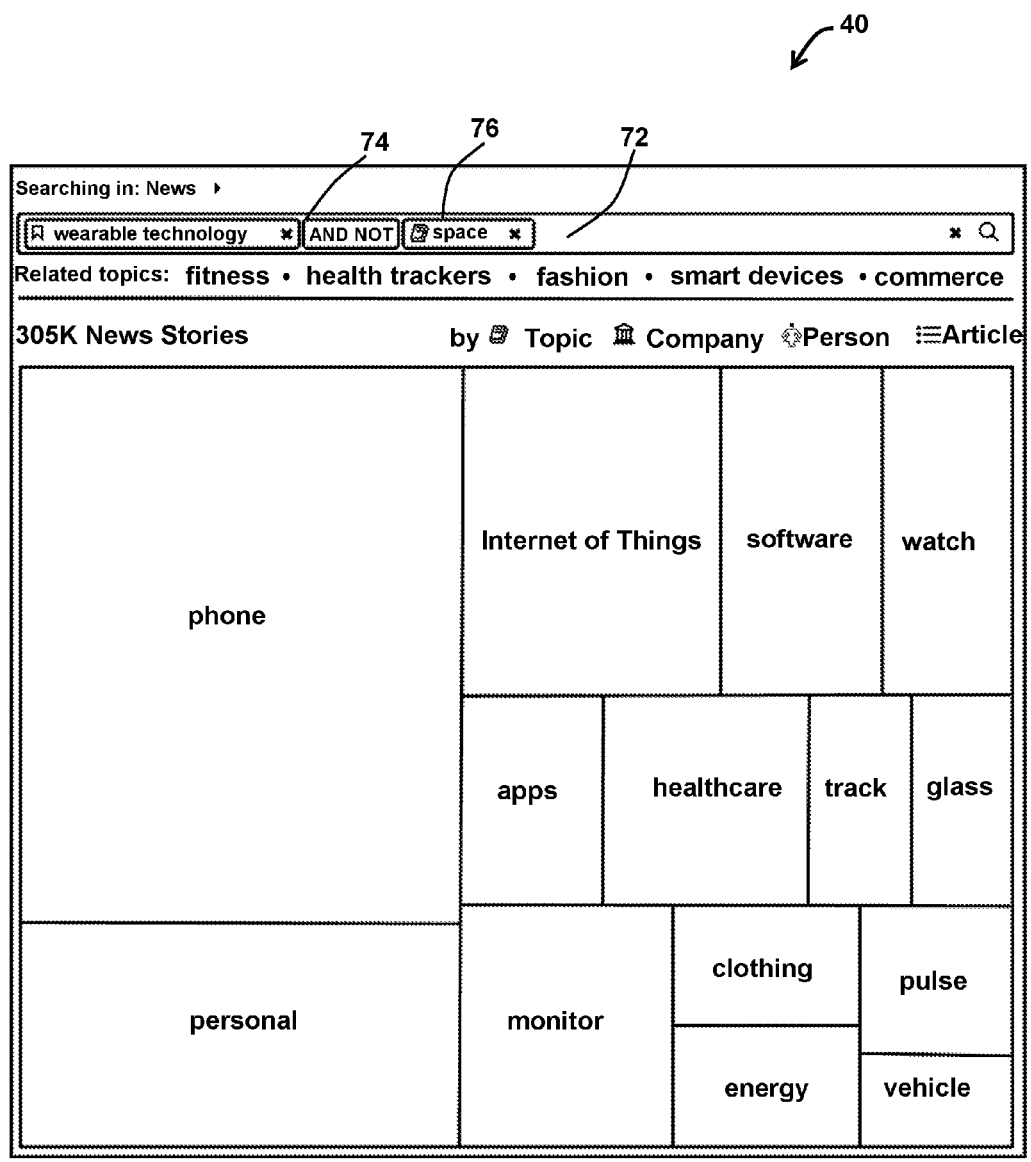
FIG. 6 is another user interface corresponding to a query modification step of FIG. 1.

As shown in FIG. 5, a user may select a term for positive or negative addition in conjunctive form with a menu. FIG. 6 shoes the result of selecting the negative conjunctive option. Each of the illustrated items in the treemap may produce a similar menu upon selection. The corresponding area in the treemap is expected to provide an intuitive indication of the likely magnitude of the effect of the query adjustment on search results.

In some embodiments, as shown in FIG. 5, selecting item 68 (in this case, the term "space") reveals a menu 70 for adding conjunctive terms, both positive and negative. In this example, selection of the trashcan icon causes a negative conjunctive Boolean operator to be associated with the item, and selection of the "+" causes a positive conjunctive Boolean operator to be associated with the item.

FIG. 6 shows a modified query 72 after selection of the negative conjunctive Boolean option in menu 70. As illustrated, a Boolean operator 74 and the item 76 have been added to the query. In some embodiments, a user may submit this refine query (e.g., by selecting the magnifying glass icon) and receive different results or further edit the query (e.g., by selecting more terms or by typing in more terms).

In some embodiments, the different components of the Boolean query may be graphically represented in a way that indicates their functionality. For example, Boolean operators may be represented with a different color, font, visual weight, or the like from that used to represent the terms upon which the Boolean operators operate, and each Boolean operatory type (e.g., "and," "or," and "not") may be represented the same way with a distinct set of visual attributes from the other types to make it easy to visually parse the query.

Figure 7:
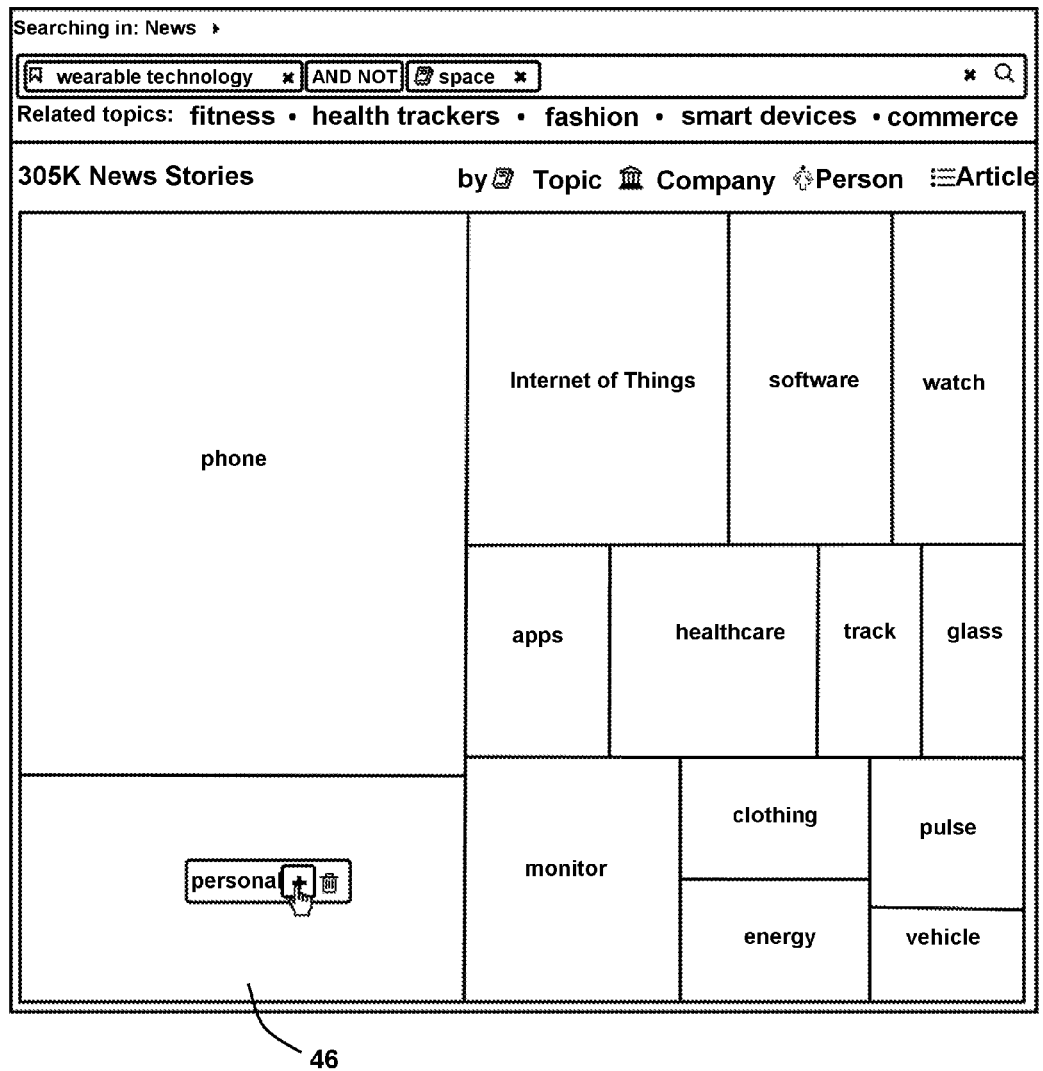
FIG. 7 is another user interface corresponding to a query modification step of FIG. 1.
Figure 8:
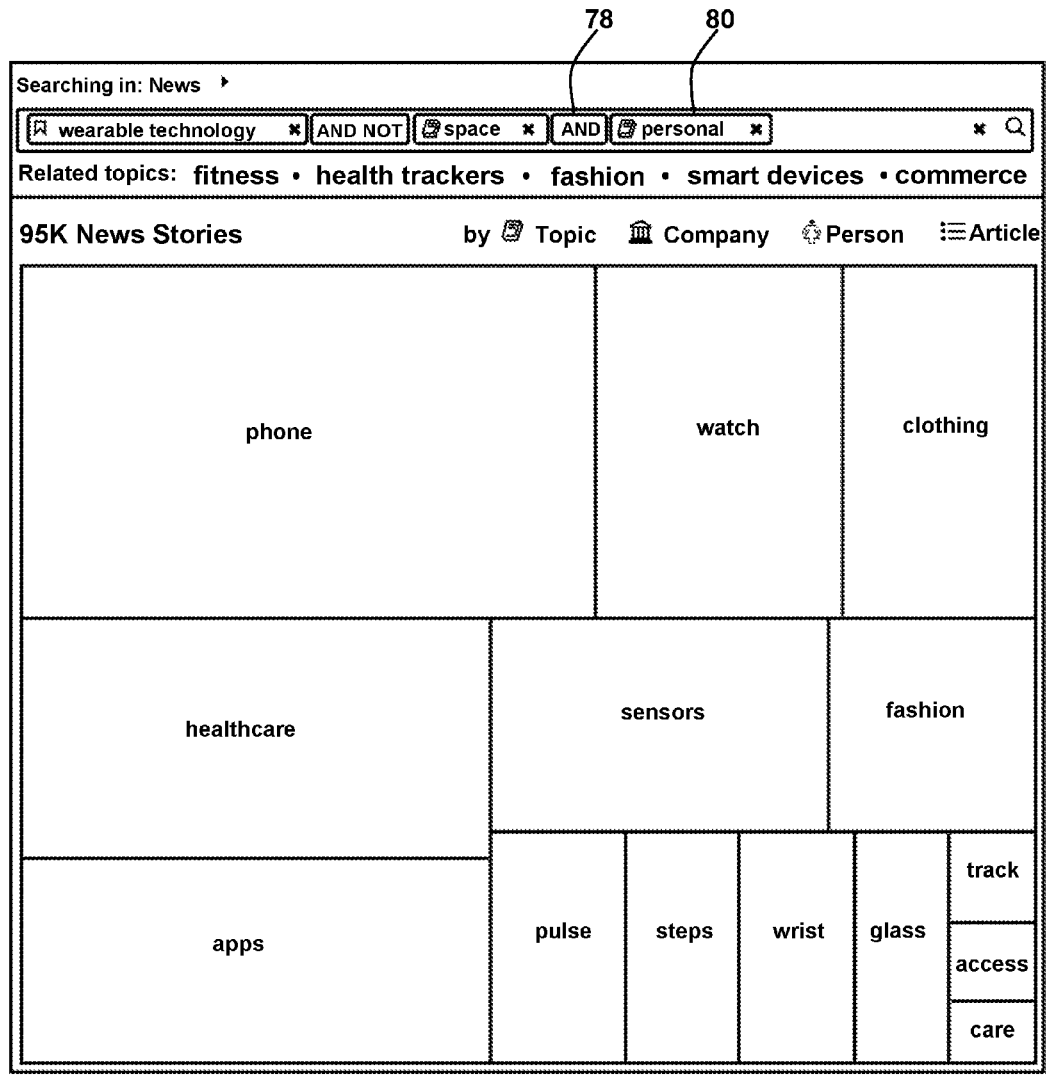
FIG. 8 is another user interface corresponding to a query modification step of FIG. 1.

FIG. 7 illustrates selection of item 46 to reveal another instance of the same menu, and FIG. 8 illustrates a resulting further refinement to the query of FIG. 6 with an additional Boolean operator of the conjunctive positive form 78 and additional term 80 selected in the interaction of FIG. 7. In FIG. 7, the user may select the "+" sign to add the term "personal" as a narrowing term associated with conjunctive operator "and" in FIG. 8.

Figure 9:
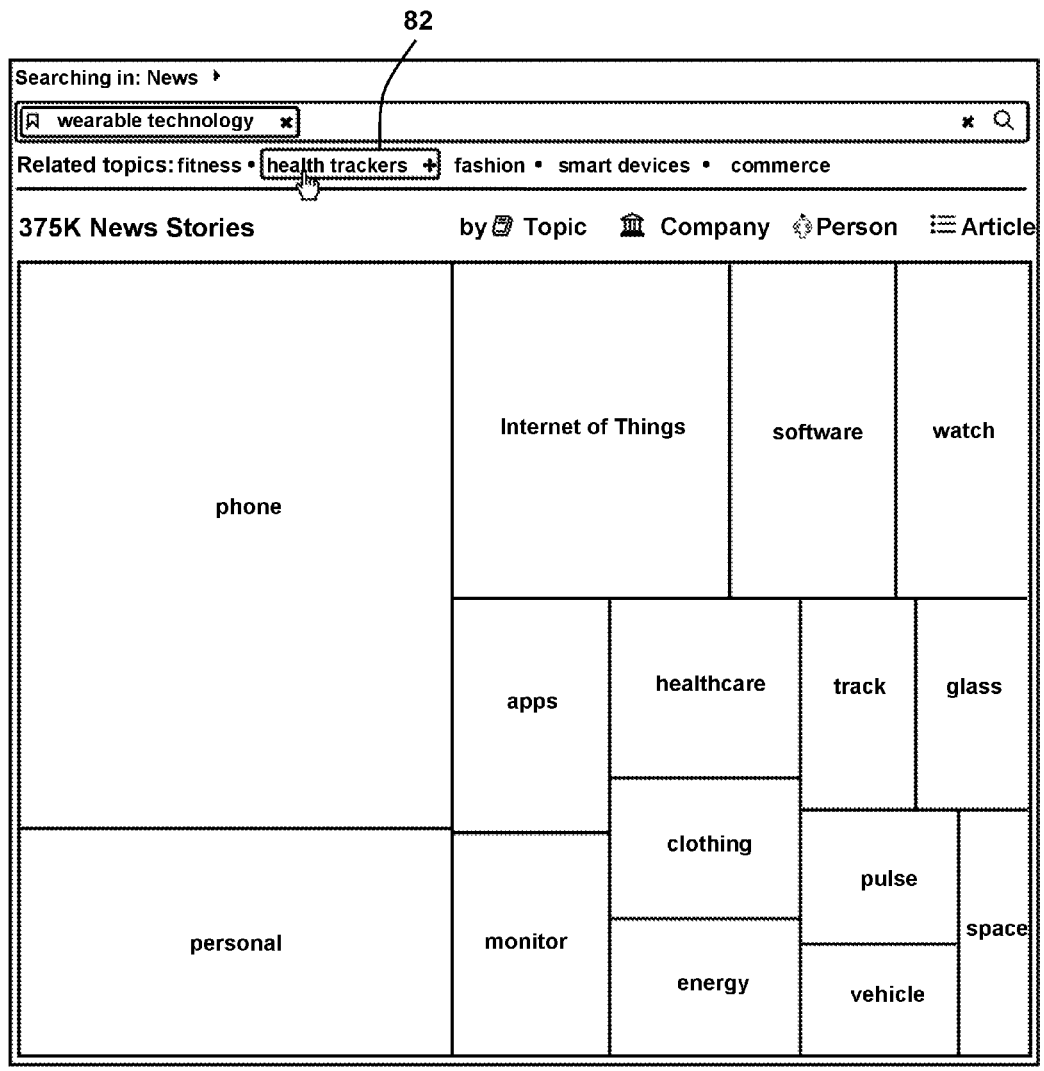
FIG. 9 is another user interface corresponding to a query modification of FIG. 1.

A similar technique may be used to add disjunctive query components, as illustrated in FIG. 9. Selected broadening term 82 includes a "+" input in an associated menu that when selected by the user causes the corresponding broadening term to be added in association with a disjunctive Boolean operator, "or." Embodiments are consistent with both positive and negative disjunctive Boolean operators.

In some embodiments, users may struggle with the order of operation of Boolean operators. For instance, the query "apples AND oranges OR bananas" yields a different result from "oranges OR bananas AND apples," because the operator "AND" is evaluated before the operator "OR" by convention. Parenthesis or brackets are typically used to express a different order of operations from the default. Some embodiments may be operative to insert parenthesis for the user to specify an order operations. A variety of techniques may be used to determine user intent and the corresponding correct syntax. For instance, some embodiments may determine whether the addition is intended to be a broadening or narrowing refinement based on whether the user selected a term in the treemap or the list of related terms above in the graphical interfaces of FIGS. 3-9. Based on this choice, and the context of the current query, ambiguity as to order of operation may be resolved with by selecting the option that broadens or narrows.

In some cases, the desired order of operations may be inferred from the order in which selections of narrowing and broadening terms are received. For example, in response to broadening term selection being followed by a narrowing term selection, some embodiments may place the existing query in parentheses before applying the narrowing term. Conversely, in response to a narrowing term being followed by a broadening term selection, some embodiments may place the existing query in parentheses before applying the broadening term. For example, the existing query may be "'wearable technology' AND phone," and the user may click on the broadening term "fitness." In some embodiments, the resulting query is "('wearable technology' AND phone) OR fitness." Or in another example, the existing query may be "'wearable technology' AND phone," and the user may click on the narrowing term "sensor." In some embodiments, the resulting query is "(('wearable technology' AND phone) OR fitness) AND sensor." As a result, some embodiments may apply parenthesis more liberally than is required, as some parenthesis may be redundant to the implicit order of operations of the Boolean operators, but the results are expected to conform the user's intent. Some embodiments may recursively decompose the query into an abstract syntax tree and remove each set of parentheses that do not affect the structure of the abstract syntax tree due to the parenthesis being redundant to the implicit order of operations of the Boolean operators, or some embodiments may leave the parenthesis in place to favor simpler operation.

Some embodiments may use additional user inputs for specifying order of operations, e.g., in some embodiments, a user may hold down a shift key while selecting multiple narrowing or broadening terms to indicate a desire to place the terms in parenthesis. Or a user may drag and drop terms into an area of the query input between parentheses to indicate a desire to add those terms to that portion of the query. Or some embodiments may include an input by which a user designates a query result as a "corpus," and the query process may begin again on this newly defined corpus, effectively imposing an order of operations in which the previous query is, in effect, performed before new queries.

In some embodiments, the refined query (e.g., shown in FIG. 8) may be composed entirely without a user typing a single key after entering the initial query, thereby facilitating relatively fast modifications to queries with relatively low cognitive load being placed on the user. Further, graphically representing the Boolean query components with visual attributes that indicate their functionality and distinguish different Boolean operators is expected to help train users on how to compose Boolean queries. And representing narrowing or broadening terms with graphical attributes (e.g., area, font-size, color, saturation, transparency, location, drop shadow, vibratory movement, or the like) that indicate the effect of adding the term to a modified query (e.g., a large area tile in the treemap indicates a large number of documents will remain after a positive conjunctive addition or be removed by a negative conjunctive addition) is expected to reduce the number of refinements needed to make a query responsive to the user's intent.

Having reached a satisfactory query with the interfaces of FIGS. 2-9, next, some embodiments of the process 10 in FIG. 1 may present search results and further query-adjustment interfaces with narrowing and broadening terms, as indicated in block 20. Examples of the presented interface are described with reference to FIGS. 3 and 4.

Figure 10:
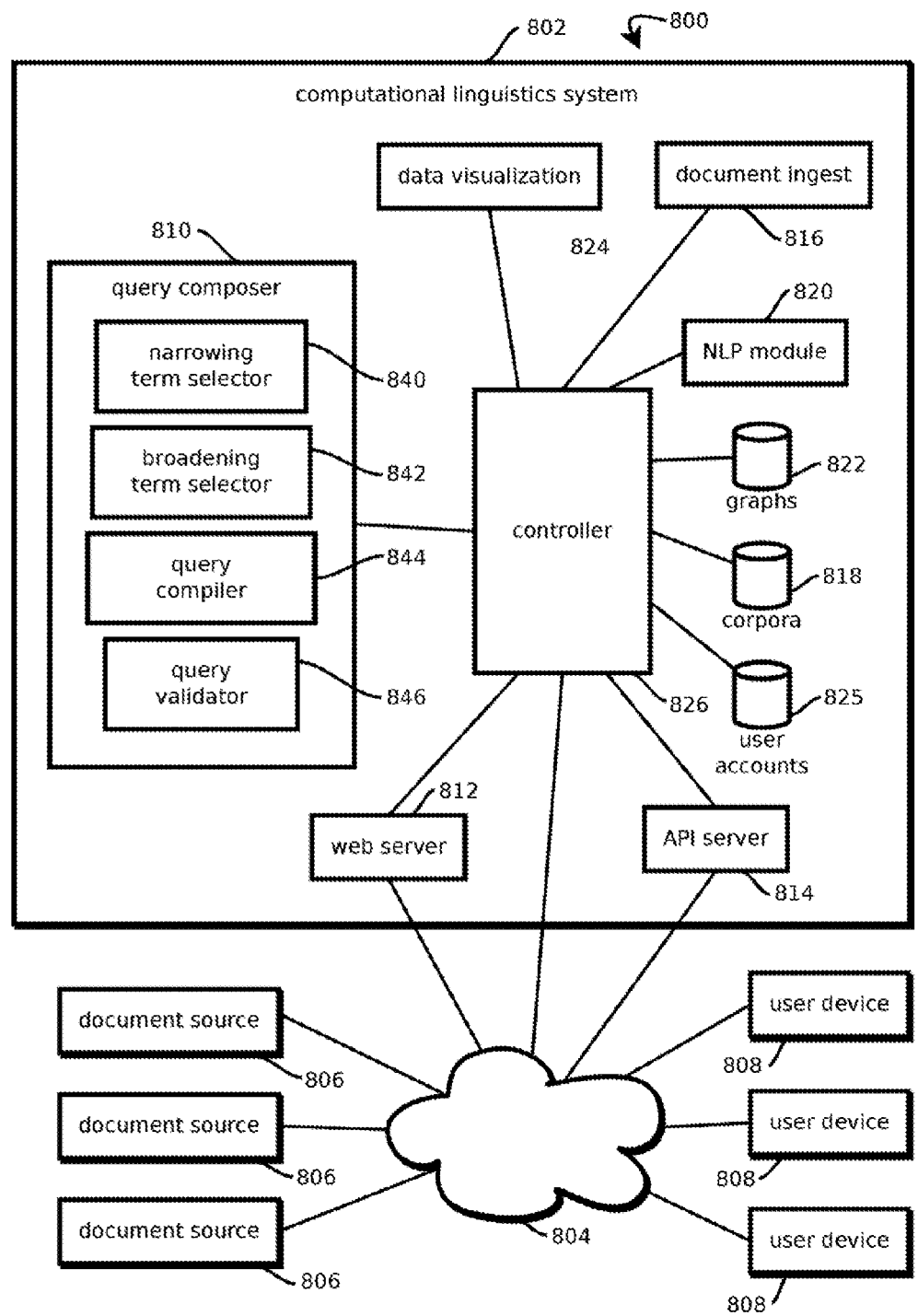
FIG. 10 is a block diagram of the logical architecture of a system configured to perform the process of FIG. 1.

FIG. 10 illustrates, in block diagram form, the logical architecture of an example of a computing environment 800 in which the above-described techniques may be implemented. In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit queries to the system 802 (which may be geographically remote) via a web browser executing on user devices 808 and exchanges over the Internet 804. In some embodiments, users may submit queries to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a query composer 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the query composer 810 includes a narrowing term selector 840, a broadening term selector 842, a query compiler 844, and a query validator 846. In some embodiments, the narrowing term selector may perform the steps described above to select narrowing terms, and the broadening term selector 842 may perform the steps described above to select broadening terms. In some embodiments, the query compiler 844 may be operative to add the refinements to the Boolean query, as described above with reference to Blocks 26 and 28. In some embodiments, the user may compose invalid or unnecessarily complex Boolean queries. To assist the users, some embodiments may include a query validator 46. In some embodiments, the query validator 46 may analyze the query to identify, for example, logical inconsistencies guaranteed to provide zero search results, for example, requesting both X and not X. Further, in some embodiments, the query validator a 46 may be operative to simplify Boolean expressions with Boolean algebra, for example, by factoring parentheticals and consolidating redundant terms. In some embodiments, the simplified Boolean expression may be presented to the user for further refinements.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity websites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 11:
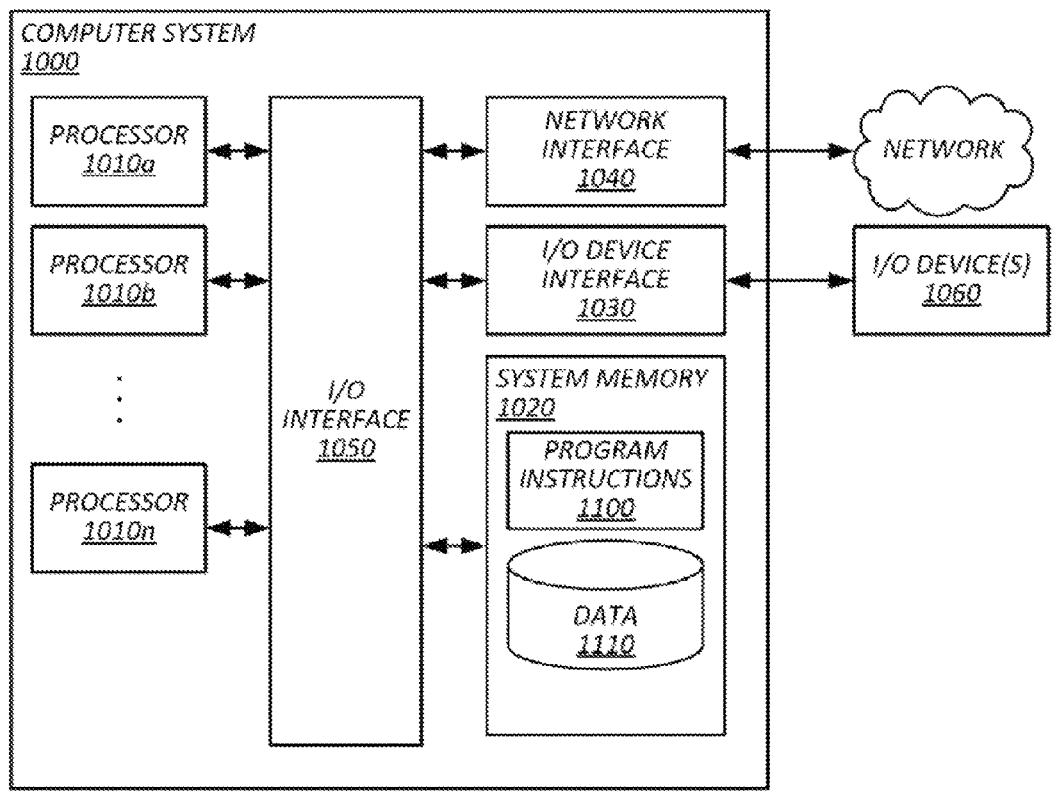
FIG. 11 is a block diagram of an example of a computer system by which the above-techniques may be implemented.

FIG. 11 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequence, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method of refining Boolean queries, the method comprising: obtaining, with one or more processors, a query provided by a user via a user's computing device; searching, with one or more processors, a corpus of documents based on the query to identify responsive documents, the corpus having more than 2,000 documents; selecting, with one or more processors, narrowing terms that pertain to respective subsets of the responsive documents; selecting, with one or more processors, broadening terms related to the query; instructing, with one or more processors, the user's computing device to present a graphical user interface comprising: graphical representations of the narrowing terms; graphical representations of the broadening terms; and one or more user inputs by which the user refines the query by adding a selected narrowing term or a selected broadening term; obtaining, with one or more processors, a user selection of a broadening term or a narrowing term; forming, with one or more processors, a refined query based on the user selection; searching, with one or more processors, at least part of the corpus based on the refined query to identify refined responsive documents; and instructing, with one or more processors, the user's computing device to present an updated graphical user interface with information about the refined responsive documents.

2. The method of embodiment 1, wherein the graphical user interface comprises: a plurality of graphical regions, each graphical region corresponding to one of the narrowing terms, wherein a spatial dimension of each graphical region is selected based on an amount of the responsive documents responsive to a refined query including the respective term as a conjunctive addition to the query.

3. The method of embodiment 2, wherein the spatial dimensions are assigned by performing steps for partitioning a plane.

4. The method of embodiment 1, wherein the graphical user interface comprises: a plurality of graphical regions, each graphical region corresponding to one of the narrowing terms, wherein a visual weight or size of each graphical region is selected based on an amount of the responsive documents responsive to a refined query including the respective term as a conjunctive addition to the query.

5. The method of any of embodiments 1-4, wherein the graphical user interface comprises: a positive conjunctive input selector for each narrowing term; and a negative conjunctive input selector for each narrowing term.

6. The method of any of embodiments 1-5, wherein the graphical user interface comprises: a positive disjunctive input selector for each broadening term; and a negative disjunctive input selector for each broadening term.

7. The method of any of embodiments 1-6, wherein forming a refined query comprises: refactoring a Boolean query combining a plurality of narrowing terms and a plurality of broadening terms to shorten the Boolean query.

8. The method of any of embodiments 1-7, wherein the graphical user interface comprises: a query entry input having graphical regions representing query constituent components and user-selectable inputs for each of the components by which the respective component is removed from the query.

9. The method of embodiment 8, wherein: the graphical regions each have a respective non-textual visual attribute indicative of whether the respective graphical region corresponds to a positive conjunctive query element, a negative conjunctive query element, an positive disjunctive query element, or a negative disjunctive query element, and the graphical regions are added to the graphical user interface by inserting a specification for the graphical regions into a document object model for the graphical user interface with scripting code executed within a web browser responsive to one or more event handlers mapped to inputs by which the user requests the addition of the corresponding query elements.

10. The method of any of embodiments 1-9, wherein the narrowing terms are selected by performing steps for selecting narrowing terms.

11. The method of any of embodiments 1-10, wherein the broadening terms are selected by performing steps for selecting broadening terms.

12. The method of any of embodiments 1-11, comprising: after selecting the broadening terms pre-processing candidate search results for a refined query based on one of the broadening terms before the one of the broadening terms is selected by the user.

13. The method of any of embodiments 1-12, comprising: iteratively presenting query results and broadening terms and narrowing terms corresponding to those query results each time the user selects one or more broadening or narrowing terms through at least three iterations.

14. The method of any of embodiments 1-13, comprising: iteratively presenting query results and broadening terms and narrowing terms corresponding to those query results each time the user selects and submits one or more broadening or narrowing terms.

15. The method of any of embodiments 1-14, wherein the graphical user interface comprises: means for selecting among a plurality of filters for the search results, wherein the refined responsive documents both satisfy a user-selected filter and the refined query.

16. The method of any of embodiments 1-15, wherein a plurality of categories of narrowing terms are selected, and wherein the graphical user interfaces comprises a plurality of inputs for faceted selection of the narrowing terms by category.

17. The method of any of embodiments 1-16, comprising: receiving a user selection of a narrowing term; and before the narrowing term is added to the refined query, causing the user device to present at least part of a plurality of documents to which the selected narrowing term pertains.

18. The method of embodiment 17, comprising: presenting a time-series graphical representation of amounts of documents to which the selected narrowing term applies.

19. The method of any of embodiments 1-18, comprising: receiving another user selection of another term after forming the refined query; and in response to receiving the other user selection, embedding the refined query in parentheses and then forming another refined query with the other term outside of the parenthesis.

20. The method of any of embodiments 1-19, comprising: before obtaining the query, obtaining the corpus, the corpus comprising more than 5000 documents; for each document in the corpus, with one or more processors: determining a respective n-gram vector, each n-gram vector comprising a plurality of values each indicating presence of a respective n-gram in text of the respective document, wherein the n-gram vectors indicate at least 500 values and correspond to at least some n-grams including three words; and determining scores indicating an amount of semantic similarity relative to the other documents in the analyzed corpus based on angles between the n-gram vector of the respective document and n-gram vectors of the other documents in the analyzed corpus; wherein presenting information about the refined responsive documents comprises presenting a force-directed graph of the responsive documents wherein at least one parameter of a physics model of the force directed graph corresponds to scores indicating the amount of semantic similarity.

21. A system, comprising: one or more processors; and memory storing instructions that when executed by the processors cause the processors to effectuate operations comprising those of any of embodiments 1-20.

22. A tangible, non-transitory, machine readable medium storing instructions that when executed by processors cause the processors to effectuate operations comprising those of any of embodiments 1-20.

What is claimed is:
1. A method, comprising:
causing, with one or more processors, a computing device to display a user interface with a result of a first Boolean query applied to a data set, wherein:
the user interface represents subsets of the result as concurrently displayed graphical regions;
each of the graphical regions representing a respective subset of query results has a visual attribute determined based on a respective statistic of the respective subset;
the user interface includes a user-selectable input by which the first Boolean query is changed, at least in part, without the user typing additional query terms;
the user interface provides a plurality of candidate query terms that are user selectable without typing the candidate query terms; and the user interface graphically distinguishes between presented candidate query terms that are broadening terms and candidate query terms that are narrowing terms;

receiving, with one or more processors, a user selection entered via the user-selectable input, the user selection indicating a term to be added to the first Boolean query;

based on the user selection, with one or more processors, forming a second Boolean query;

applying, with one or more processors, the second Boolean query to the data set to produce a result of the second Boolean query; and causing, with one or more processors, the computing device to display the result of the second Boolean query.

2. The method of claim 1, wherein:

the data set includes one or more corpora of unstructured text documents, the one or more corpora including more than 50,000 natural language text documents;

causing the computing device to display the user interface comprises:

receiving the first Boolean query from the user computing device;

recursively decomposing the first Boolean query to form an abstract syntax tree representation of the first Boolean query;

accessing a plurality of previously formed indices based on terms parsed from the first Boolean query to identify documents including the terms;

determining the subsets based on a semantic analysis of the one or more corpora;

determining respective statistics of the subsets;

determining dimensions in display space of the user interface based on the respective statistics;

sending instructions to render the user interface over a network from a computational linguistics system to a browser executing on the computing device, wherein the user interface is presented within the browser and is formed, at least in part, by invoking WebGL commands to enlist a graphical processing unit of the computing device in rendering at least part of the user interface;

the user interface includes means for depicting a space-filling layout;

causing the computing device to display the result of the second Boolean query comprises:

sending instructions to the computing device to update the user interface by inserting or removing components of a document object model of the user interface in memory.

3. The method of claim 1, wherein forming the second Boolean query comprises:

selecting a Boolean operator based on whether the term is a broadening term or a narrowing term;

determining a position in the first Boolean query to add the term based on steps for determining an order of operations; and forming an abstract syntax tree representation of the second Boolean query based on both the selected Boolean operator and the determined position.

4. The method of claim 1, wherein:

the user interface provides a dynamically adjustable visual guide to edit Boolean queries the user.

5. The method of claim 1, wherein:

causing the computing device to display the result of the second Boolean query comprises causing portions of the graphical user interfaces to be constructed dynamically with client-side scripts executed by the computing device.

6. The method of claim 1, wherein:

applying the second Boolean query comprises interrogating structured data associated with unstructured text documents among the data set.

7. The method of claim 1, wherein causing the computing device to display the result of the second Boolean query comprises:

causing the computing device to display a synthesis of responsive documents.

8. The method of claim 1, wherein causing the computing device to display the result of the second Boolean query comprises:

steps for presenting search results.

9. The method of claim 1, wherein causing a computing device to display a user interface with a result of a first Boolean query comprises:

causing the computing device to display a proportional shape graph.

10. The method of claim 1, wherein causing a computing device to display a user interface with a result of a first Boolean query comprises:

iteratively and alternatively subdividing available space in a region of the display based on the statistics and selecting rectangle sizes based on whether an aspect ratio of a candidate rectangle satisfies a threshold.

11. The method of claim 1, wherein the user interface comprises user selectable filters based on metadata of the data set.

12. The method of claim 1, wherein the user interface comprises a query editing input having means for indicating status of query terms.

13. The method of claim 1, wherein the user interface comprises a plurality of user selectable candidate query terms, the candidate query terms being selected based on a topic to which the candidate terms pertain.

14. The method of claim 1, wherein terms in different regions of the interface, with different visual attributes, appearing concurrently, are selectable by the user to add query elements and Boolean operators associated with those query elements.

15. The method of claim 1, wherein:

the term is a negative disjunctive term selected from among a plurality of candidate query terms determined by means for distributional semantic analysis using means for compressing sparse matrices and means for performing matrix operations.

16. The method of claim 1, wherein:

the term is a positive disjunctive term selected by the user clicking on a corresponding area of the user interface and invoking a corresponding event handler executed in a browser of the computing device, the positive disjunctive term being selected from among a plurality of positive disjunctive terms determined based on means for latent semantic analysis.

17. The method of claim 1, wherein:

forming the second Boolean query comprises steps for refactoring a Boolean query and steps for validating a Boolean query.

18. The method of claim 1, wherein:

receiving a user selection comprises receiving both a user selected positive conjunctive term and a user selected negative conjunctive term;

the second Boolean query includes both the positive conjunctive term and the negative conjunctive term; and the user interface is caused to be updated to display text of the second Boolean query.

19. A tangible, non-transitory, machine-readable medium storing instructions that when executed by one or more processors effectuate operations comprising:

causing, with one or more processors, a computing device to display a user interface with a result of a first Boolean query applied to a data set, wherein:
the display represents subsets of the result as concurrently displayed graphical regions;
each of the graphical regions representing a respective subset of query results has a visual attribute determined based on a respective statistic of the respective sub set;
the user interface includes a user-selectable input by which the first Boolean query is changed without the user typing additional query terms;
the user interface provides a plurality of candidate query terms that are user selectable without typing the candidate query terms; and
the user interface graphically distinguishes between presented candidate query terms that are broadening terms and candidate query terms that are narrowing terms;
receiving, with one or more processors, a user selection entered via the user-selectable input, the user selection indicating a term to be added to the first Boolean query;
based on the user selection, with one or more processors, forming a second Boolean query;
applying, with one or more processors, the second Boolean query to the data set to produce a result of the second Boolean query; and
causing, with one or more processors, the computing device to display the result of the second Boolean query.

20. The medium of claim 19, the operations comprising:
causing the computing device to display the user interface comprises:
receiving the first Boolean query from the user computing device;
recursively decomposing the first Boolean query to form an abstract syntax tree representation of the first Boolean query;
accessing a plurality of previously formed indices based on terms parsed from the first Boolean query to identify documents including the terms;
determining the subsets based on a semantic analysis of the one or more corpora;
determining respective statistics of the subsets;
determining dimensions in display space of the user interface based on the respective statistics;
sending instructions to render the user interface over a network from a computational linguistics system to a browser executing on the computing device, wherein the user interface is presented within the browser and is formed, at least in part, by invoking WebGL commands to enlist a graphical processing unit of the computing device in rendering at least part of the user interface;
the user interface includes means for depicting a space-filling layout;
causing the computing device to display the result of the second Boolean query comprises:
sending instructions to the computing device to update the user interface by inserting or removing components of a document object model of the user interface in memory; and
the data set includes one or more corpora of unstructured text documents, the one or more corpora including more than 50,000 natural language text document.

21. The medium of claim 19, wherein forming the second Boolean query comprises:
selecting a Boolean operator based on whether the term is a broadening term or a narrowing term;
determining a position in the first Boolean query to add the term based on steps for determining an order of operations; and
forming an abstract syntax tree representation of the second Boolean query based on both the selected Boolean operator and the determined position.

22. The medium of claim 19, wherein:
the user interface provides a dynamically adjustable visual guide to edit Boolean queries the user.

23. The medium of claim 19, the operations comprising:
causing the computing device to display the result of the second Boolean query comprises causing portions of the graphical user interfaces to be constructed dynamically with client-side scripts executed by the computing device.

24. The medium of claim 19, the operations comprising:
applying the second Boolean query comprises interrogating structured data associated with unstructured text documents among the data set.

25. The medium of claim 19, wherein causing the computing device to display the result of the second Boolean query comprises:
causing the computing device to display a synthesis of responsive documents.

26. The medium of claim 19, wherein causing the computing device to display the result of the second Boolean query comprises:
steps for presenting search results.

27. The medium of claim 19, wherein causing a computing device to display a user interface with a result of a first Boolean query comprises:
causing the computing device to display a proportional shape graph.

28. The medium of claim 19, wherein causing a computing device to display a user interface with a result of a first Boolean query comprises:
iteratively and alternatively subdividing available space in a region of the display based on the statistics and selecting rectangle sizes based on whether an aspect ratio of a candidate rectangle satisfies a threshold.

29. The medium of claim 19, wherein the user interface comprises user selectable filters based on metadata of the data set.

30. The medium of claim 19, wherein the user interface comprises a query editing input having means for indicating status of query terms.

31. The medium of claim 19, wherein the user interface comprises a plurality of user selectable candidate query terms, the candidate query terms being selected based on a topic to which the candidate terms pertain.

32. The medium of claim 19, wherein terms in different regions of the interface, with different visual attributes, appearing concurrently, are selectable by the user to add query elements and Boolean operators associated with those query elements.

33. The medium of claim 19, wherein:
  the term is a negative disjunctive term selected from among a plurality of candidate query terms determined by means for distributional semantic analysis using means for compressing sparse matrices and means for performing matrix operations.

34. The medium of claim 19, wherein:
  the term is a positive disjunctive term selected by the user clicking on a corresponding area of the user interface and invoking a corresponding event handler executed in a browser of the computing device, the positive disjunctive term being selected from among a plurality of positive disjunctive terms determined based on means for latent semantic analysis.

35. The medium of claim 19, wherein forming the second Boolean query comprises steps for refactoring a Boolean query and steps for validating a Boolean query.

36. The medium of claim 19, the operations comprising:
  receiving a user selection comprises receiving both a user selected positive conjunctive term and a user selected negative conjunctive term;
  the second Boolean query includes both the positive conjunctive term and the negative conjunctive term; and
  the user interface is caused to be updated to display text of the second Boolean query.

\* \* \* \* \*